(12) United States Patent
Mukherjee et al.

(10) Patent No.: US 12,294,705 B2
(45) Date of Patent: May 6, 2025

(54) VECTOR QUANTIZATION FOR PREDICTION RESIDUAL CODING

(71) Applicant: Google LLC, Mountain View, CA (US)

(72) Inventors: Debargha Mukherjee, Cupertino, CA (US); Lester Lu, Los Angeles, CA (US); Elliott Karpilovsky, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 449 days.

(21) Appl. No.: 17/779,692

(22) PCT Filed: Dec. 23, 2019

(86) PCT No.: PCT/US2019/068274
§ 371 (c)(1),
(2) Date: May 25, 2022

(87) PCT Pub. No.: WO2021/107964
PCT Pub. Date: Jun. 3, 2021

(65) Prior Publication Data
US 2023/0011893 A1  Jan. 12, 2023

Related U.S. Application Data

(60) Provisional application No. 62/940,271, filed on Nov. 26, 2019.

(51) Int. Cl.
*H04N 19/126* (2014.01)
*H04N 19/119* (2014.01)
(Continued)

(52) U.S. Cl.
CPC ......... *H04N 19/126* (2014.11); *H04N 19/119* (2014.11); *H04N 19/12* (2014.11);
(Continued)

(58) Field of Classification Search
CPC .... H04N 19/126; H04N 19/119; H04N 19/12; H04N 19/176; H04N 19/42; H04N 19/463; H04N 19/60
See application file for complete search history.

(56) References Cited

U.S. PATENT DOCUMENTS 6,549,666 B1 * 4/2003 Schwartz ............... H04N 19/46
375/E7.064
6,691,092 B1 * 2/2004 Udaya Bhaskar .... G10L 19/097
704/223
(Continued)

FOREIGN PATENT DOCUMENTS

CN   101009839 A   8/2007
CN   109076248 A   12/2018
(Continued)

OTHER PUBLICATIONS

International Search Report and Written Opinion of International Application No. PCT/US2019/068274 dated Jul. 9, 2020, 16 pgs.
(Continued)

*Primary Examiner* — Zaihan Jiang
(74) *Attorney, Agent, or Firm* — Young Basile Hanlon & MacFarlane, P.C.

(57) ABSTRACT

Residual coding using vector quantization (VQ) is described. A flag indicating whether a residual block for the current block is encoded using VQ. In response to the flag indicating that the residual block is encoded using VQ, a parameter indicating an entry in a codebook is decoded, and the residual block is decoded using the entry. In response to the flag indicating that the residual block is not encoded using VQ, the residual block is decoded based on a skip flag indicating whether the current block is encoded using transform skip. The current block is reconstructed using the residual block.

18 Claims, 11 Drawing Sheets

(51) Int. Cl.
  *H04N 19/12* (2014.01)
  *H04N 19/176* (2014.01)
  *H04N 19/42* (2014.01)
  *H04N 19/463* (2014.01)
  *H04N 19/60* (2014.01)

(52) U.S. Cl.
  CPC ........... *H04N 19/176* (2014.11); *H04N 19/42* (2014.11); *H04N 19/463* (2014.11); *H04N 19/60* (2014.11)

(56) References Cited

U.S. PATENT DOCUMENTS

| | | | | |
|---|---|---|---|---|
| 8,811,495 | B1* | 8/2014 | Wen | H04N 19/463 375/240.27 |
| 2006/0023963 | A1* | 2/2006 | Boliek | G06F 17/148 382/268 |
| 2006/0239348 | A1* | 10/2006 | Zhang | H04N 19/105 375/240.12 |
| 2008/0319739 | A1* | 12/2008 | Mehrotra | G10L 19/008 704/E19.044 |
| 2012/0082226 | A1* | 4/2012 | Weber | H04N 7/141 375/E7.246 |
| 2019/0052877 | A1* | 2/2019 | Zhang | H04N 19/124 |
| 2020/0128252 | A1* | 4/2020 | Fu | H04N 19/186 |
| 2022/0303586 | A1* | 9/2022 | Du | H04N 19/105 |

FOREIGN PATENT DOCUMENTS

| | | | | |
|---|---|---|---|---|
| EP | 1 811 785 A2 | | 7/2007 | |
| WO | WO-2017/133753 | * | 2/2016 | |
| WO | WO-2021003325 A1 | * | 1/2021 | ............. G06N 3/045 |

OTHER PUBLICATIONS

Siu-Wai Wu et al., "HDTV Compression with Vector Quantization of Transform Coefficients", Proceedings of SPIE, Visual Communications and Image Processing '91, vol. 1605, Nov. 11, 1991, pp. 73-84.

Christopher F Barnes et al., "Advances in Residual Vector Quantization: A Review", IEEE Transactions on Image Processing, IEEE Service Center, Piscataway, NJ, US, vol. 5, No. 2, Feb. 1996, pp. 226-262.

Vivek K. Goyal, "Theoretical Foundations of Transform Coding", IEEE Signal Processing Magazine, Sep. 2001, pp. 9-21.

* cited by examiner

VECTOR QUANTIZATION FOR PREDICTION RESIDUAL CODING

CROSS-REFERENCE TO RELATED APPLICATION(S)

This application claims priority to and the benefit of U.S. Provisional Patent Application Ser. No. 62/940,271, filed Nov. 26, 2019, the entire disclosure of which is hereby incorporated by reference.

BACKGROUND

Digital video streams may represent video using a sequence of frames or still images. Digital video can be used for various applications including, for example, video conferencing, high-definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

A first aspect is an apparatus for decoding a current block of video. The apparatus includes a memory and a processor. The processor is configured to execute instructions stored in the memory to decode, from a compressed bitstream, a flag indicating whether a residual block for the current block is encoded using vector quantization (VQ); in response to the flag indicating that the residual block is encoded using VQ, execute instructions to: decode a parameter indicating an entry in a codebook; and decode the residual block using the entry; in response to the flag indicating that the residual block is not encoded using VQ, execute instructions to: decode the residual block based on a skip flag indicating whether the current block is encoded using transform skip; and reconstruct the current block using the residual block.

A second aspect is an apparatus for encoding a current block using vector quantization (VQ). The apparatus includes a memory and a processor. The processor is configured to execute instructions stored in the memory to determine whether the current block is not to be encoded using a transform skip mode; and in response to determining that the current block is not to be encoded using transform skip mode, execute instructions to: obtain a residual block for the current block; select a VQ gain index and a VQ shape index using the residual block; encode, in a compressed bitstream, the VQ gain index; and encode, in the compressed bitstream, the VQ shape index.

A third aspect is a method for encoding a current block using vector quantization (VQ). The method includes determining that the current block is not to be encoded using a transform skip mode; obtaining a residual block for the current block; selecting a VQ gain index and a VQ shape index using the residual block; encoding, in a compressed bitstream, the VQ gain index; and encoding, in the compressed bitstream, the VQ shape index.

These and other aspects of this disclosure are disclosed in the following detailed description of the implementations, the appended claims and the accompanying figures.

BRIEF DESCRIPTION OF THE DRAWINGS

The description herein makes reference to the accompanying drawings described below, wherein like reference numerals refer to like parts throughout the several views.

DETAILED DESCRIPTION

Figure 1:
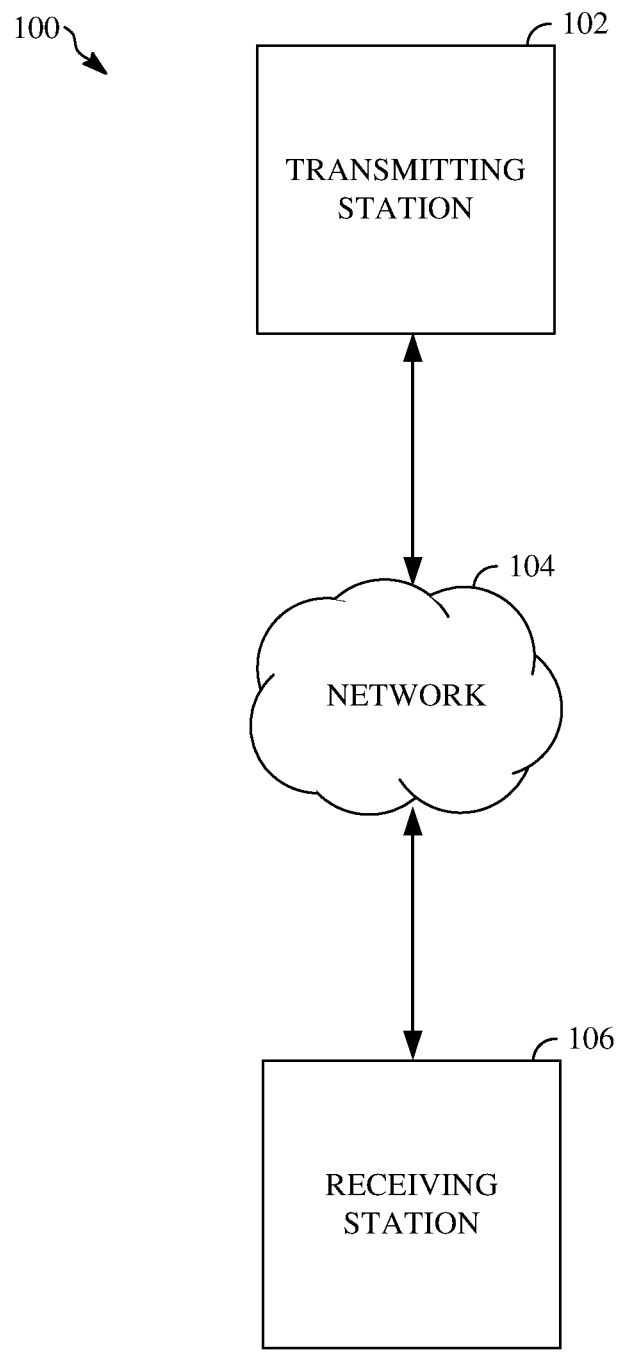
FIG. 1 is a schematic of an example of a video encoding and decoding system.

Video compression schemes may include breaking respective images, or frames, into smaller portions, such as blocks, and generating an encoded bitstream using techniques to limit the information included for respective blocks thereof. The encoded bitstream can be decoded to re-create the source images from the limited information. For example, a video compression scheme can include transforming the prediction residual (i.e., the residual block) of a current block of a video stream from the pixel domain into transform coefficients of transform blocks in the frequency domain. The transform coefficients are quantized and entropy coded into an encoded bitstream. A decoder uses the encoded transform coefficients to decode or decompress the encoded bitstream to prepare the video stream for viewing or further processing. To reconstitute the prediction residual, a decoder may receive the quantized transformed coefficients, dequantize the transformed coefficients, and inverse transform the dequantized transform coefficients.

There may be many different transform types and transform sizes available for transforming the prediction residual of a given block. There may be as many as, or even more than, 16 transform types available, such as a discrete cosine transform (DCT) or an asymmetric discrete sine transform (ADST). There may be a varying number of transform sizes available, such as based on the size of the block representing the prediction residual. For example, an 8×8 block representing the prediction residual may be transformed using one 8×8 transform block or four 4×4 transform blocks.

To achieve the best compression efficiency, a typical encoder tries many transform types and transform sizes and selects, for use in transforming the prediction residual, the transform type and transform size combination resulting in a lowest rate-distortion cost. This process is referred to as transform search. However, the transform search can be a very time-consuming process, as the number of transform types and sizes may be large. Further, in many cases, the encoder may repeat the transform search process multiple times for the same prediction residual (e.g., where two different prediction modes result in the same prediction, and, therefore, the same prediction residual). In a typical coding process, after the prediction residual is transformed Implementations of this disclosure address problems such as these by omitting transforming the prediction residual to the frequency domain. As such, the coding steps related to transforming (in an encoder) and inverse transforming (in a decoder) of the prediction residual can be omitted (i.e., bypassed).

As further described below, a current block can be predicted using intra prediction or inter prediction. Some prediction residuals (i.e., the prediction signals) resulting from intra prediction can exhibit certain characteristics. Encoding the transform coefficients of such prediction residuals (i.e., the prediction residuals exhibiting the certain characteristics) tend to require a higher bitrate owing to the high frequencies in the transform coefficients.

Figure 6:
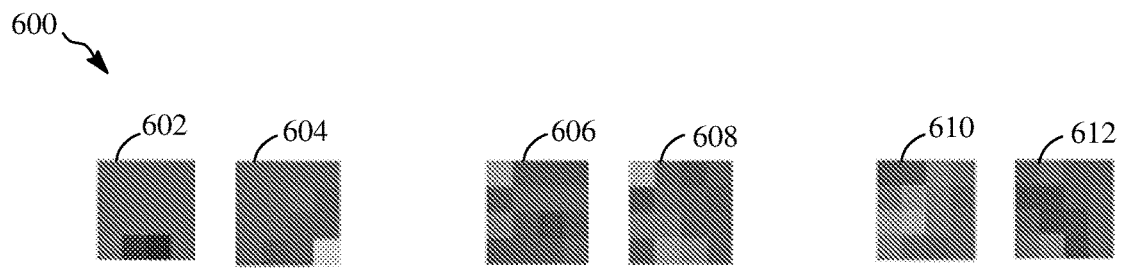
FIG. 6 is a diagram of examples of characteristics exhibited by residual blocks.

FIG. 6 is a diagram of examples 600 of characteristics exhibited by residual blocks. The examples 600 include illustrative prediction residual blocks 602-612. The prediction residual blocks 602-612 are examples of 4×4 residual blocks. However, the prediction residual blocks can be of any size. The prediction residual blocks 602-604 are examples of prediction residuals exhibiting localized characteristics. The contrast of the pixel values are indicative of the localized characteristics. The prediction residual blocks 606-608 are examples of prediction residuals exhibiting non-smooth characteristics. The prediction residual blocks 610-612 are examples of prediction residuals exhibiting diagonal patterns characteristics. Diagonal pattern in this case means either a northeast-to-southwest diagonal (e.g., the prediction residual block 610) or a or northwest-to-southeast diagonal (e.g., the prediction residual block 611).

According to implementations of this disclosure, instead of transforming a prediction residual to the frequency domain, an encoder can look-up a closest match to the prediction residual in a codebook (i.e., a lookup table). The codebook can include prototypical prediction residuals. The prototypical prediction residuals may be referred to herein as codewords or code vectors. The encoder can encode the index of the closest match in a compressed bitstream. As such, an approximation of the prediction block can be indicated (via the index) in the compressed bitstream. As such, the prediction residual is said to be quantized to the closest matching code vector. A decoder can decode the index, look up the of prototypical prediction residual in the codebook, and reconstitute the indicated prototypical prediction residual as the prediction residual. As further described below, the lookup table can be more than one lookup table. For example, the look up table can include a shape codebook and a gain codebook. As also further described below, the index can be more than one index. For example, the index can include a shape index (i.e., an indicator of an entry in the shape codebook) and a gain index (i.e., an indicator of an entry in the gain codebook).

By using a codebook of prediction residuals, transform coding can be by-passed. Consequently, the bit rate can be reduced, especially for those prediction residuals that exhibit high frequencies and would otherwise require high bit rates for the coding of the transform coefficients. Additionally, the decoding process can be faster as compared to a decoding process that involves inverse transforming of transform coefficients.

Further details of techniques for vector quantization in video compression are described herein with initial reference to a system in which they can be implemented, as shown in FIGS. 1 through 6.

FIG. 1 is a schematic of an example of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
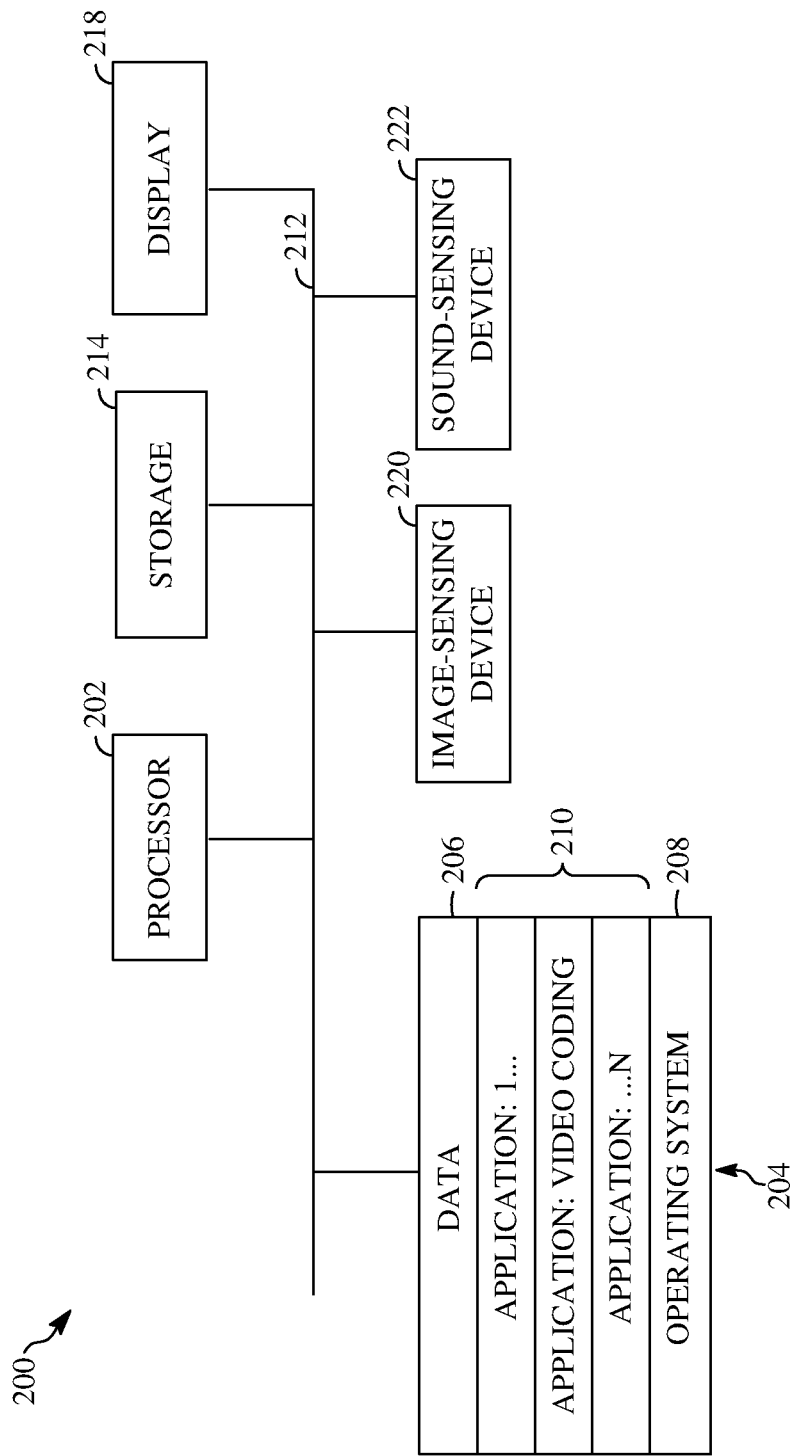
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used e.g., a Hypertext Transfer Protocol-based (HTTP-based) video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

In some implementations, the video encoding and decoding system 100 may instead be used to encode and decode data other than video data. For example, the video encoding and decoding system 100 can be used to process image data. The image data may include a block of data from an image. In such an implementation, the transmitting station 102 may be used to encode the image data and the receiving station 106 may be used to decode the image data. Alternatively, the receiving station 106 can represent a computing device that stores the encoded image data for later use, such as after receiving the encoded or pre-encoded image data from the transmitting station 102. As a further alternative, the transmitting station 102 can represent a computing device that decodes the image data, such as prior to transmitting the decoded image data to the receiving station 106 for display.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random-access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include a video coding application that performs the techniques described herein. The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into a single unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
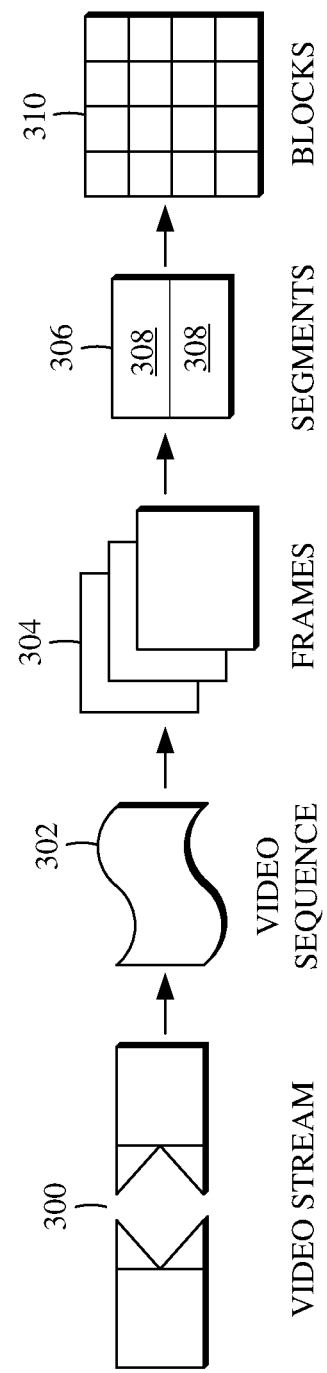
FIG. 3 is a diagram of an example of a video stream to be encoded and subsequently decoded.

FIG. 3 is a diagram of an example of a video stream 300 to be encoded and subsequently decoded. The video stream 300 includes a video sequence 302. At the next level, the video sequence 302 includes several adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
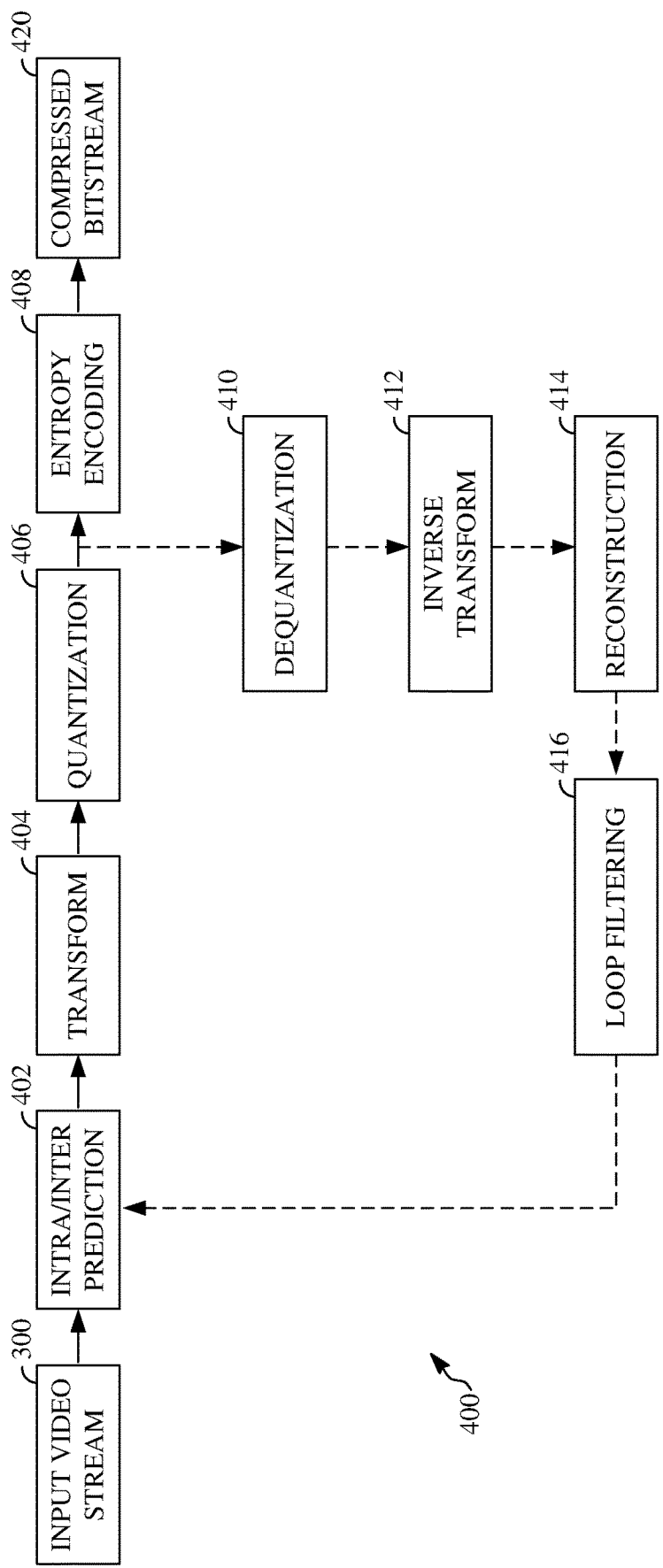
FIG. 4 is a block diagram of an example of an encoder.

FIG. 4 is a block diagram of an example of an encoder 400. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. In some implementations, a non-transform-based encoder can quantize the residual signal directly without the transform stage 404 for certain blocks or frames. In some implementations, an encoder can have the quantization stage 406 and the dequantization stage 410 combined in a common stage.

Figure 5:
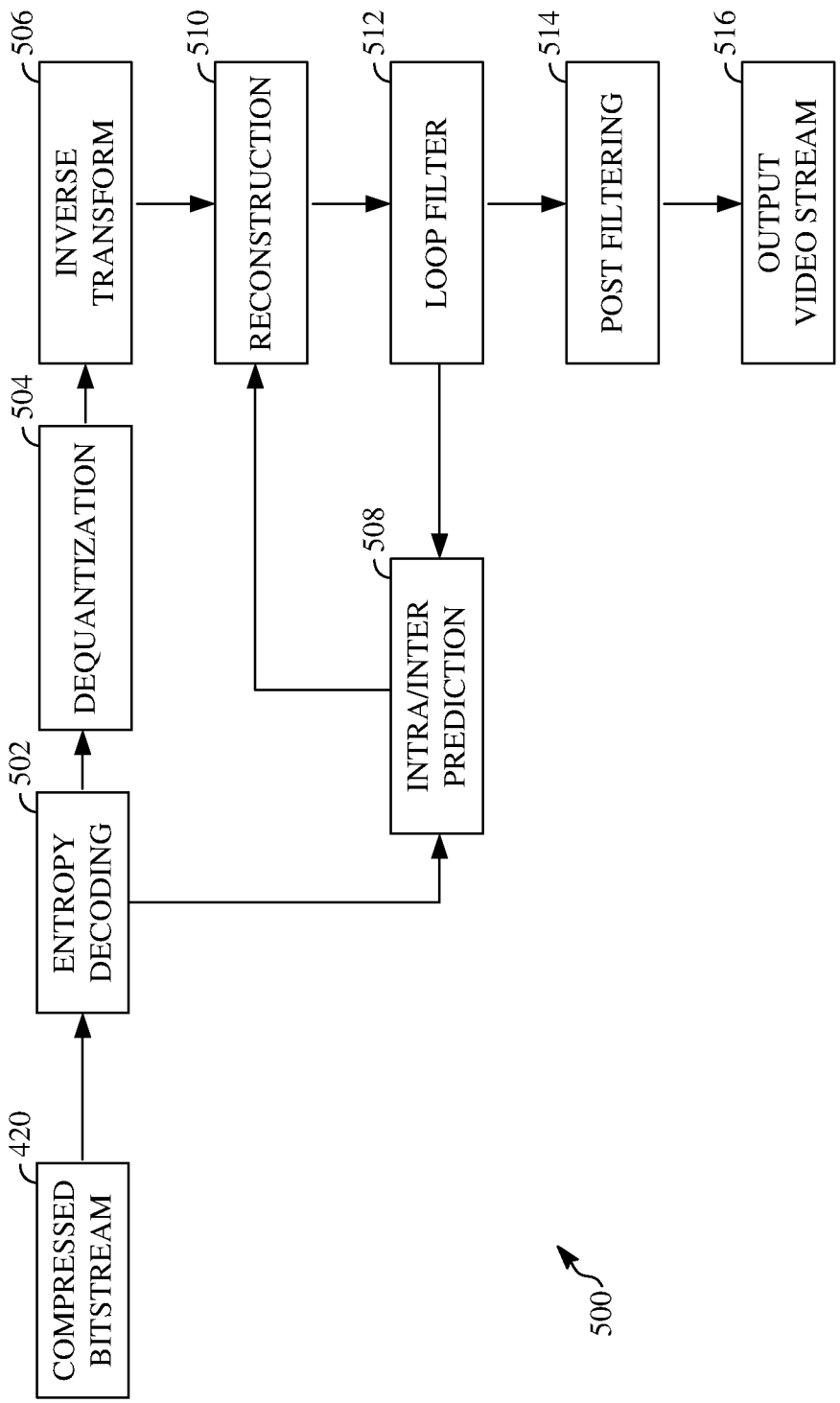
FIG. 5 is a block diagram of an example of a decoder.

FIG. 5 is a block diagram of an example of a decoder 500. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. In some implementations, the decoder 500 can produce the output video stream 516 without the deblocking filtering stage 514.

As mentioned above, the prediction residual can be quantized to a closest prototypical prediction residual using a codebook. The codebook of prediction residuals can be derived in any number of ways. In an example, the codebook can be derived using vector quantization (VQ). VQ is a quantization technique that allows the modelling of probability distribution of prototype data (i.e., training samples).

In an off-line training phase, many prediction residual blocks can be used as training samples. VQ divides the training samples into groups. VQ then represents each group of sample prediction residuals by its centroid. The centroids become the code vectors (e.g., the prototypical prediction residuals). That is, the centroids become the entries of the codebook. Several known techniques can be used to cluster the training prediction residual samples and derive the centroids (i.e., the code vectors). For example, Lloyd's algorithm, Generalized Lloyd's algorithm, Linde-Buzzo-Gray (LBG) algorithm, K-means, or some other technique can be used.

In an example of designing a codebook of 4×4 luma prediction residuals, training samples of 4×4 prediction residuals are used. Each of the training samples can be converted to an array (e.g., vector) of 16 values (i.e., pixel values) using a raster scan of the training sample. An input to the VQ algorithm used can be the number N (e.g., 256 or some other number) of desired code vectors (e.g., a size of the codebook). The resulting codebook will include N 16-value code vectors. For generally, a codebook of size P for M×N prediction residuals includes P M*N-value code vectors. The same technique can be used for designing codebooks for any color component (chroma U, chroma Y, etc.) sized (e.g., M×N) prediction residual.

Figure 7:
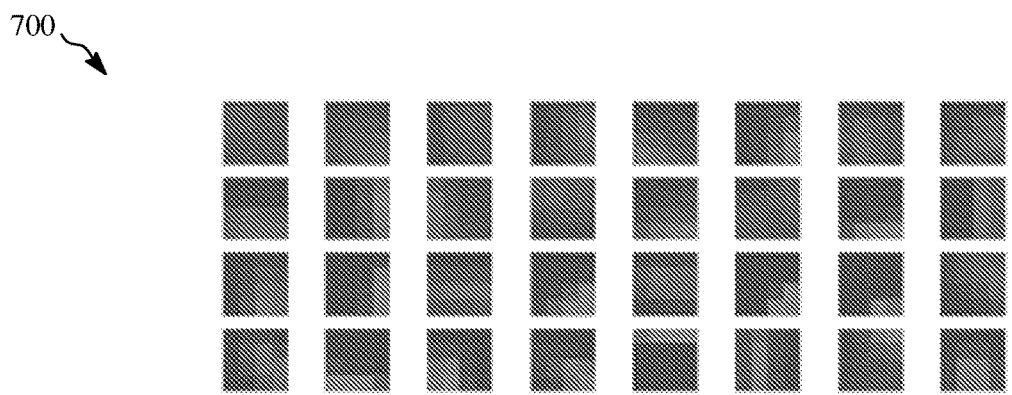
FIG. 7 is a diagram of an example of a codebook according to implementations of this disclosure.

FIG. 7 is a diagram of an example of a codebook 700 according to implementations of this disclosure. The codebook 700 illustrates the learned (i.e., during the training phase) code vectors. As mentioned above, code vectors of a codebook can be represented as one-dimensional arrays of pixel values. For ease of visualization, the code vectors of the codebook 700 are illustrated as 2-dimensional residual blocks, which are ordered from highest selection frequency during training (i.e., starting from the top left of the codebook 700) to lowest selection frequency during training (i.e., ending at the bottom right of the codebook 700). The codebook 700 includes 256 code vectors. However, only the top and bottom 32 code vectors are respectively illustrated.

In an example, Gain-Shape Vector Quantization (GSVQ) can be used to derive a magnitude (i.e., gain) codebook and a shape (i.e., normalized signal) codebook. For simplicity of reference, GSVQ may also be referred to as VQ in the following description. In an example, the codebooks for 4×4 luminance (Y) prediction residuals can be such that the gain codebook includes 16 scalar codewords and the shape codebook can include 256 code vectors.

In GSVQ, during training, the norms of each of the training prediction residuals are extracted and a gain (i.e., magnitude) codebook is derived for the extracted norms. The norm can be the Euclidean norm (i.e., the length) of a training prediction residual. As is known, the Euclidean norm of a vector $x=(x_0, x_1, \ldots, x_{15})$ is given by $\|x\| = \sqrt{x_0^2 + x_1^2 + \ldots + x_{15}^2}$.

A unit-norm training prediction residual refers to the training prediction residual where each of the values of the training prediction residual is divided by the norm of the training prediction residual. That is, given a training prediction residual x, the unit-norm training prediction residual is given by $x/\|x\|$. The unit-norm training prediction residual is so called because the length of the unit-norm training prediction residual is 1.

The gain codebook can be derived using a K-means algorithm on the norms of the training prediction residuals. The shape codebook can be derived by, first, generating a Voronoi diagram from random unit-norm training prediction residuals; then iteratively applying a K-means algorithm. In each iteration, the steps of the K-means algorithm can include computing sign-invariant distance metrics; clustering the training samples based on the distances; and computing normalized cluster means. The sign-invariant distance metrics are computed between at least some of the training prediction residuals and each current centroid. In an example, for a unit-norm training prediction residual p and a centroid q, the sign-invariant distance metric d(p,q) can be calculated as $d(x,y) = \min\{\|x-y\|, \|x+y\|\}$. That is, the sign-invariant distance metric d(p,q) can be the minimum of a first length of the vector (x−y) and a second length of the vector (x+y).

Figure 8:
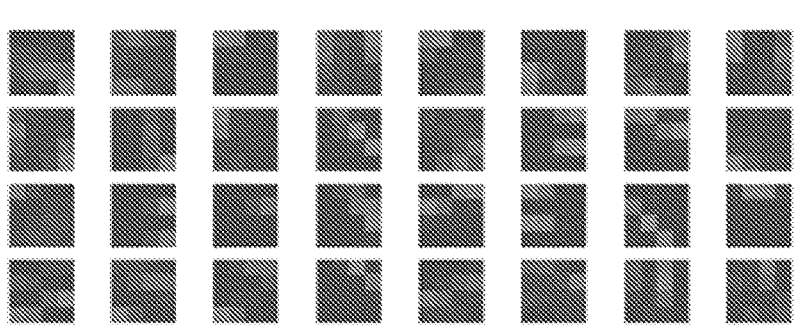
FIG. 8 is a diagram of functionality of a prediction residual encoding stage using vector quantization according to implementations of this disclosure.

FIG. 8 is a diagram of functionality of a prediction residual encoding stage 800 using vector quantization according to implementations of this disclosure. The prediction residual encoding stage 800 quantizes a prediction residual to a closest gain value and a closest shape vector.

In an example, the prediction residual encoding stage 800 can be or can be included in the transform stage 404 of FIG. 4. In another example, the prediction residual encoding stage 800 may be a stage that is separate from the transform stage 404 of FIG. 4. In any case, and while not specifically shown in FIG. 4, when the encoder 400 (or one or more components therein) determines that VQ (i.e., GSVQ) is to be performed for the prediction residual (i.e., the prediction block) that is produced by the intra/inter prediction stage 402 of FIG. 4, then at least the quantization stage 406, the dequantization stage 410, and the inverse transform stage 412 of FIG. 4 are by passed. In an example, VQ may be determined to be used (or at least tested) only when the prediction residual results from intra prediction. In an example, VQ may be determined to be used if the prediction block is smaller than or equal to a certain threshold block size. In an example, the threshold block size is 4×4 for luma prediction blocks.

The prediction residual encoding stage 800 includes a normalization stage 802 and an GSVQ stage 806. The normalization stage 802 can receive a prediction residual x that is produced by intra/inter prediction stage 402. In an example, the prediction residual x can be the result of intra prediction. In an example, the prediction residual x can be of size 4×4 or some other block size. The prediction residual x can be a luminance (Y) block, a chrominance (U or V) residual block, or some other color component residual block. For simplicity of explanation, the notation x for a prediction residual may be used to refer to either or both of the 2-dimensional M×N (e.g., 4×4) residual block or the equivalent 1-dimensional, raster-scanned M*N (e.g., 4*4=16) vector.

The normalization stage 802 generates (e.g., calculates, extracts, etc.) the norm (e.g., the Euclidean length, $\|x\|$) of the prediction residual x. The norm $\|x\|$ is scalar-quantized using the gain codebook. The gain index (i.e., the index of the value in the gain codebook to which the norm $\|x\|$ is quantized) can be encoded in a compressed bitstream, such as the compressed bitstream 420 of FIG. 4, as indicated by an arrow 804.

The unit-norm prediction residual $x/\|x\|$ is input to the GSVQ stage 806, which quantizes the unit-norm vector separately using the shape codebook. That is, the GSVQ stage 806 identifies the closest code vector to the unit-norm vector. A distance (e.g., an error) measure can be used to identity the closest code vector. In an example, the sign-invariant distance metric, as described above, between the unit-norm prediction residual $x/\|x\|$ and at least some of the code vectors of the shape codebook can be used. The distance measure can be the mean square error. The distance measure can be a sum of absolute differences error. Any other suitable distance measure can be used.

The shape index (i.e., the index of the code vector in the shape codebook to which the unit-norm $x/\|x\|$ is quantized) can be encoded in the compressed bitstream, such as the compressed bitstream 420 of FIG. 4, as indicated by an arrow 808. As such, the prediction residual can be approximated by (e.g., encoded to, compressed to, etc.) the product of an optimal (e.g., closest) gain and an optimal (e.g., closest) shape.

In an implementation, a sign can additionally be encoded in the compressed bitstream. The sign can be used to reduce the size of the codebook. The sign can be a binary symbol that represents the values +1 or −1. For example, a sign bit value of 0 can represent a value of −1 and a sign bit value of 1 can represent a value of +1, or vice versa. As such, a prediction residual can be represented by a gain index, a shape index, and a sign.

In the case that the sign is not used, the prediction residual can be represented by a gain and a shape. The gain is a positive scalar, and the shape is a unit norm vector.

Assuming, for illustration purposes only, the following two length-4 vectors: $v_1=[-1,1,1,1]$ and $v_2=[1, -1, -1, -1]$, which may be represented, respectively, with (gain=2, shape=[−0.5, 0.5, 0.5, 0.5]) and (gain=2, shape=[0.5, −0.5, −0.5, −0.5]). In such a definition, the shapes of the vectors $v_1$ and $v_2$ may be mapped to different shape codewords even though the vectors $v_1$ and $v_2$ are mere flipped versions of each other. In an implementation, the shapes of the vectors $v_1$ and $v_2$ can be treated as being the same shape and their signs as decoupled.

Accordingly, in an implementation, the vectors $v_1$ and $v_2$ can be represented, respectively, with the 3-tuples (gain=2, sign=1, shape=[−0.5, 0.5, 0.5, 0.5]) and (gain=2, sign=−1, shape=[−0.5, 0.5, 0.5, 0.5]). As such, the size of the shape codebook can be halved. That is, for example, if the codebook includes [−0.5, 0.5, 0.5, 0.5], then it need not include the code vector [0.5, −0.5, −0.5, −0.5]. As such, in implementations that use the sign, the search of code vectors in the codebook can be faster because the searches of gain, sign and shape can be done independently.

To summarize, using GSVQ, a prediction residual can be represented by a gain index and a shape index; alternatively, a prediction residual can be represented by a gain index, a shape index and a sign (which can be a binary symbol).

As is known, some codecs use what may be referred to as a transform skip mode. In the transform skip mode, an encoder can decide to skip transforming the residual block to the frequency domain but may still perform a quantization step on the residual block.

Transform skip can be selected by the encoder when a residual block has a sufficiently small energy such that the energy can be ignored. As such, in a skip block mode, the prediction signal itself is encoded along with a SKIP flag. Skip mode can be particularly useful for text, graphic, and/or screen content videos because those videos typically contain large areas of flat and/or smooth regions, such that intra and inter predictions of such regions yield almost perfect predictions with no (or little) prediction residue. In an example, to decide whether a transform block should be skipped, the encoder can compare the rate-distortion (RD) costs of skip and no skip, then can choose the one with the smaller RD cost.

For a current prediction residual, an encoder according to implementations of this disclosure communicates to a decoder (via a compressed bitstream) how the prediction residual is encoded (i.e., a prediction residual encoding mode). That is, the encoder needs to communicate whether transform coding is skipped, whether transform coefficients were generated for the prediction residual, or whether the prediction residual is encoded via GSVQ (as described with respect to FIG. 8).

At least two (2) syntax elements can be used to describe the prediction residual encoding mode. A first syntax element (i.e., USE_VQ) indicates whether GSVQ is used to encode a residual block. A second syntax element (i.e., SKIP) indicates whether the prediction residual is encoded with the transform skip mode. The at least two syntax elements can be written to a compressed bitstream in a header of a prediction block, in a header of block containing the prediction block, in a header of a macro-block, in a header of a transform block, some other header, or a combination thereof.

In an example, USE_VQ and SKIP can each be a binary symbol. In an example, a value of 1 for USE_VQ indicates that the prediction residual is encoded using GSVQ and a value of 0 indicates that the prediction residual is not encoded using GSVQ. In an example, a value of 1 for SKIP indicates that the prediction residual is encoded using transform skip and a value of 0 indicates that the prediction residual is not encoded using transform skip. However, other values are possible for the USE_VQ and/or SKIP syntax elements.

Figure 9:
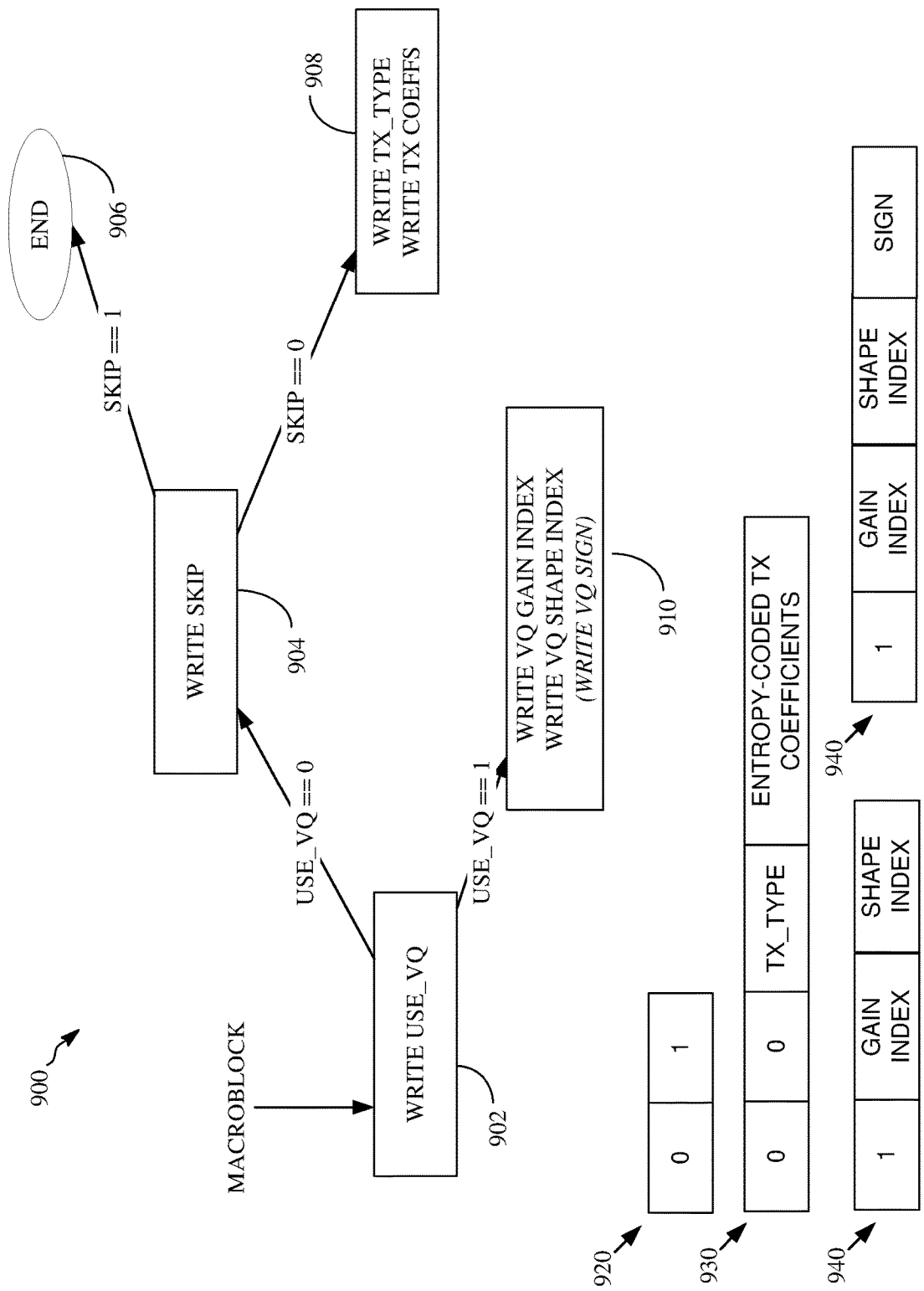
FIG. 9 is a diagram of a flowchart of a technique for bitstream syntax coding when using vector quantization in an encoder according to an implementation of this disclosure.

FIG. 9 is a diagram of a flowchart of a technique 900 for bitstream syntax coding when using vector quantization in an encoder according to an implementation of this disclosure. In an example, the technique 900 can be performed (e.g., executed, carried out, etc.) for a prediction residual that is of size 4×4 and that results from intra prediction. However, the disclosure is not so limited. The technique 900 can write syntax elements describing modes of encoding residual blocks into a compressed bitstream, such as the compressed bitstream 420 of FIG. 4.

The technique 900 can be implemented, for example, as a software program that may be executed by computing devices such as the transmitting station 102. For example, the software program can include machine-readable instructions that may be stored in a memory such as the memory 204 or the secondary storage 214, and that, when executed by a processor, such as the processor 202, may cause the computing device to perform the technique 900. The technique 900 can be implemented using specialized hardware or firmware. For example, a hardware component can be configured to perform the technique 900. As explained above, some computing devices may have multiple memories or processors, and the operations described in the technique 900 can be distributed using multiple processors, memories, or both.

At 902, the technique 900 can receive a macroblock. A macroblock can be a block of size 128×128, 64×64, or some other M×N size. The macroblock can be partitioned into smaller block, which can be known as coding blocks. A coding block may further be partitioned into one or more prediction blocks. A prediction block is then predicted, as described with above with respect to the intra/inter prediction stage 402 of FIG. 4. As also described above, a prediction residual (e.g., a prediction block) is produced. For example, the prediction block can be a luminance block of size 4×4 and the residual block may be a corresponding 4×4 prediction block that results from intra predicting the block. A block being currently encoded by an encoder is referred to as a current block.

The technique 900 can perform a rate-distortion search between the GSVQ and transform coding to determine which results in the better RD cost. In an example, the search may be an exhaustive search. In an example, some (e.g., a subset) of the possible modes (e.g., transform types, code vectors) may be searched. If GSVQ does not result in the better RD cost, then the technique 900 writes 0 for USE_VQ to the compressed bitstream and proceeds to 904; otherwise the technique 900 writes 1 for USE_VQ to the compressed bitstream and proceeds to 910.

At 904, the technique 900 determines whether transforming the prediction residual to the frequency domain is to be skipped, corresponding to encoding the prediction residual using the transform skip mode. If the prediction residual is to be encoded using the transform skip mode, then the technique 900 writes 1 for the syntax element SKIP to the compressed bitstream and ends at 906. The prediction residual, in this case, may be itself quantized. In another example, the prediction example may itself be written to the compressed bitstream. If the prediction residual is not to be encoded using the transform skip mode, then the technique 900 writes 0 for the syntax element SKIP and proceeds to 908.

At 908, the technique 900 can select (e.g., choose, identify, search for, etc.) a transform type, which the technique 900 uses to convert the prediction residual to a transform block of transform coefficients, as described above with respect to transform stage 404 of FIG. 4. The technique 900 then encodes (i.e., writes) the transform type and the transform coefficients to the compressed bitstream as described above with respect to FIG. 4.

At 910, the technique 900 quantizes the prediction residual to a closest shape vector and a closest gain value, as described with respect to FIG. 8. The technique 900 writes (e.g., encodes) the shape index and the gain index to the compressed bitstream. In an example, a sign can also be used, as described with respect to FIG. 8. As such, the technique 900 can also write the sign to the compressed bitstream.

Bitstream portions 920, 930, 940, and 945 illustrate the different organizations of portions of the compressed bitstream.

The bitstream portion 920 illustrates the organization of the compressed bitstream when the technique 900 performs the sequence 902-904-906. As such, the bitstream portion 920 includes a 0 flag (e.g., binary value) for the USE_VQ syntax element followed by a 1 flag (e.g., binary value) for the SKIP syntax element.

The bitstream portion 930 illustrates the organization of the compressed bitstream when the technique 900 performs the sequence 902-904-908. As such, the bitstream portion 930 includes a 0 flag for the USE_VQ syntax element, followed by a 0 for the SKIP syntax element, followed by bits that encode the transform type, and followed by the entropy encoded transform coefficients.

The bitstream portion 940 illustrates the organization of the compressed bitstream when the technique 900 performs the sequence 902-910. As such, the bitstream portion 940 includes a 1 flag for the USE_VQ syntax element, followed by bits that encode the gain index, and followed by the bits that encode the shape index. It is noted that the bits that encode the shape index may precede the bits that encode the gain index in the bitstream portion 940.

The bitstream portion 945 illustrates the organization of the compressed bitstream when the technique 900 performs the sequence 902-910 and when a sign is also written to the compressed bitstream. As such, the bitstream portion 945 includes a 1 flag for the USE_VQ syntax element, followed by bits that encode the gain index, followed by the bits that encode the shape index, followed by a binary symbol indicating the sign. It is noted that the gain index, the shape index, and the sign can be written in any order.

A decoder, such as the decoder 500 of FIG. 5, can receive the compressed bitstream, such the compressed bitstream 420 of FIG. 5. The decoder includes or can have access to the same lookup tables (i.e., the shape codebook and gain codebook) as the encoder that produced the compressed bitstream.

The decoder decodes a first syntax element (USE_VQ).

In an implementation, if USE_VQ is equal to 1, then the decoder decodes a gain index and a shape index. The decoder uses the shape index to look up a shape vector (i.e., y) in a shape cookbook and uses the gain index to look up a gain scalar value (i.e., a) in the gain codebook. The decoder calculates the residual block as a·y.

In another implementation, if USE_VQ is equal to 1, then the decoder decodes a gain index, a shape index, and a sign. The decoder uses the shape index to look up a shape vector (i.e., y) in a shape cookbook and uses the gain index to look up a gain scalar value (i.e., a) in the gain codebook. The decoder calculates the residual block as sign·a·y.

If, on the other hand, USE_VQ is equal to 0, then the decoder proceeds to decode from the compressed bitstream another syntax element (SKIP).

If SKIP is equal to 1, the decoder can decode the quantized prediction residual from the compressed bitstream to obtain the residual block. If SKIP is equal to 0, the decoder can decode a transform type and transform coefficients from the compressed bitstream to obtain the prediction block, as described above with respect to FIG. 5.

The decoder can them use the residual block to reconstruct a current block, as described above with respect to FIG. 5.

Figure 10:
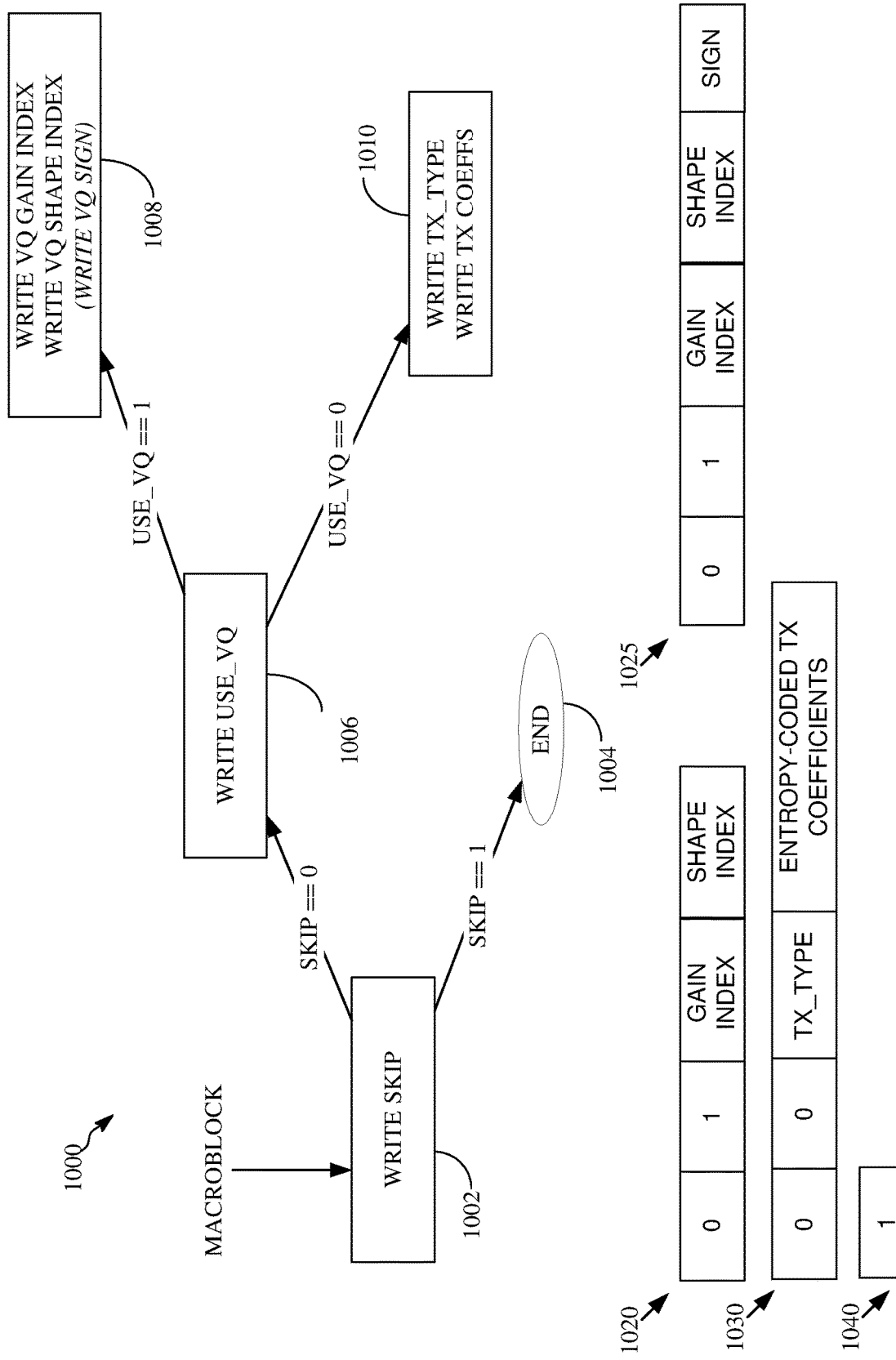
FIG. 10 is a diagram of a flowchart of a technique for bitstream syntax coding when using vector quantization in an encoder according to an implementation of this disclosure.

FIG. 10 is a diagram of a flowchart of a technique 1000 for bitstream syntax coding when using vector quantization in an encoder according to an implementation of this disclosure. In an example, the technique 1000 can be performed (e.g., executed, carried out, etc.) for a prediction residual that is of size 4×4 and that results from intra prediction. However, the disclosure is not so limited. The technique 1000 can write syntax elements describing modes of encoding residual blocks into a compressed bitstream, such as the compressed bitstream 420 of FIG. 4.

The technique 1000 can be implemented, for example, as a software program that may be executed by computing devices such as the transmitting station 102. For example, the software program can include machine-readable instructions that may be stored in a memory such as the memory 204 or the secondary storage 214, and that, when executed by a processor, such as the processor 202, may cause the computing device to perform the technique 1000. The technique 1000 can be implemented using specialized hardware or firmware. For example, a hardware component can be configured to perform the technique 1000. As explained above, some computing devices may have multiple memories or processors, and the operations described in the technique 1000 can be distributed using multiple processors, memories, or both.

At 1002, the technique 1000 can receive a macroblock. A macroblock can be a block of size 128×128, 64×64, or some other M×N size. The macroblock can be partitioned into smaller block, which can be known as coding blocks. A coding block may further be partitioned into one or more prediction blocks. A prediction block is then predicted, as described with above with respect to the intra/inter prediction stage 402 of FIG. 4. As also described above, a prediction residual (e.g., a prediction block) is produced. For example, the prediction block can be a luminance block of size 4×4 and the residual block may be a corresponding 4×4 prediction block that results from intra predicting the block. A block being currently encoded by an encoder is referred to as a current block.

At 1002, the technique 1000 determines whether transforming the prediction residual to the frequency domain is to be skipped, corresponding to encoding the prediction residual using the transform skip mode. If the prediction residual is to be encoded using the transform skip mode, then the technique 1000 writes 1 for the syntax element SKIP to the compressed bitstream and ends at 1004. The prediction residual, in this case, may be itself quantized or may be written to the compressed bitstream without quantization. If the prediction residual is not to be encoded using the transform skip mode, then the technique 1000 writes 0 for the syntax element SKIP and proceeds to 1006.

At 1006, the technique 1000 can perform a rate-distortion search between the GSVQ and transform coding to determine which results in the better RD cost, as described above with respect to 902 of FIG. 9. If GSVQ does not result in the better RD cost, then the technique 1000 writes 0 for USE_VQ to the compressed bitstream and proceeds to 1010; otherwise, the technique 1000 writes 1 for USE_VQ to the compressed bitstream and proceeds to 1008.

At 1008, the technique 1000 quantizes the prediction residual to a closest shape vector and a closest gain value, as described with respect to FIG. 8. The technique 1000 writes (e.g., encodes) the shape index and the gain index to the compressed bitstream. In an example, and as also described with respect to FIG. 8, the technique 1000 can also write a sign.

At 1010, the technique 1000 can select (e.g., choose, identify, search for, etc.) a transform type, which the technique 1000 uses to convert the prediction residual to a transform block of transform coefficients, as described above with respect to transform stage 404 of FIG. 4. The technique 1000 then encodes (i.e., writes) the transform type and the transform coefficients to the compressed bitstream as described above with respect to FIG. 4.

Bitstream portions 1020, 1025, 1030, and 1040 illustrate the different organizations of portions of the compressed bitstream.

The bitstream portion 1020 illustrates the organization of the compressed bitstream when the technique 1000 performs the sequence 1002-1006-1008. As such, the bitstream portion 1020 includes a 0 flag for the SKIP syntax element, followed by a 1 for the USE_VQ syntax element, followed by bits that encode the gain index, and followed by bits that encode the shape index. It is noted that the bits that encode the shape index may precede the bits that encode the gain index in the bitstream portion 1020.

The bitstream portion 1025 illustrates the organization of the compressed bitstream when the technique 1000 performs the sequence 1002-1006-1008 including writing a sign. As such, the bitstream portion 1025 includes a 0 flag for the SKIP syntax element, followed by a 1 for the USE_VQ syntax element, followed by bits that encode the gain index, followed by bits that encode the shape index, and followed by the sign bit. It is noted that the gain index, shape index, and sign can be written in any order the bitstream portion 1025.

The bitstream portion 1030 illustrates the organization of the compressed bitstream when the technique 1000 performs the sequence 1002-1006-1010. As such, the bitstream portion 1030 includes a 0 flag for the SKIP syntax element, followed by a 0 for the USE_VQ syntax element, followed by bits that encode the transform type, and followed by the entropy encoded transform coefficients.

The bitstream portion 1040 illustrates the organization of the compressed bitstream when the technique 1000 performs the sequence 1002-1004. As such, the bitstream portion 1040 includes a 1 flag for the SKIP syntax element.

A decoder, such as the decoder 500 of FIG. 5, can receive the compressed bitstream, such the compressed bitstream 420 of FIG. 5. The decoder includes or can have access to the same lookup tables (i.e., the shape codebook and gain codebook) as the encoder that produced the compressed bitstream.

The decoder decodes a first syntax element (SKIP). If SKIP is equal to 1, the decoder can decode the quantized prediction residual from the compressed bitstream to obtain the residual block.

If SKIP is equal to 0, the decoder decodes a second syntax element (USE_VQ).

In an implementation, if USE_VQ is equal to 1, then the decoder decodes a gain index and a shape index. The decoder uses the shape index to look up a shape vector (i.e., y) in a shape cookbook and uses the gain index to look up a gain scalar value (i.e., a) in the gain codebook. The decoder calculates the residual block as a·y.

In another implementation, if USE_VQ is equal to 1, then the decoder decodes a gain index, a shape index, and a sign. The decoder uses the shape index to look up a shape vector (i.e., y) in a shape cookbook and uses the gain index to look up a gain scalar value (i.e., a) in the gain codebook. The decoder calculates the residual block as sign·a·y.

If, on the other hand, USE_VQ is equal to 0, the decoder can decode a transform type and transform coefficients from the compressed bitstream to obtain the prediction block, as described above with respect to FIG. 5.

The decoder can then use the residual block to reconstruct a current block, as described above with respect to FIG. 5.

Figure 11:
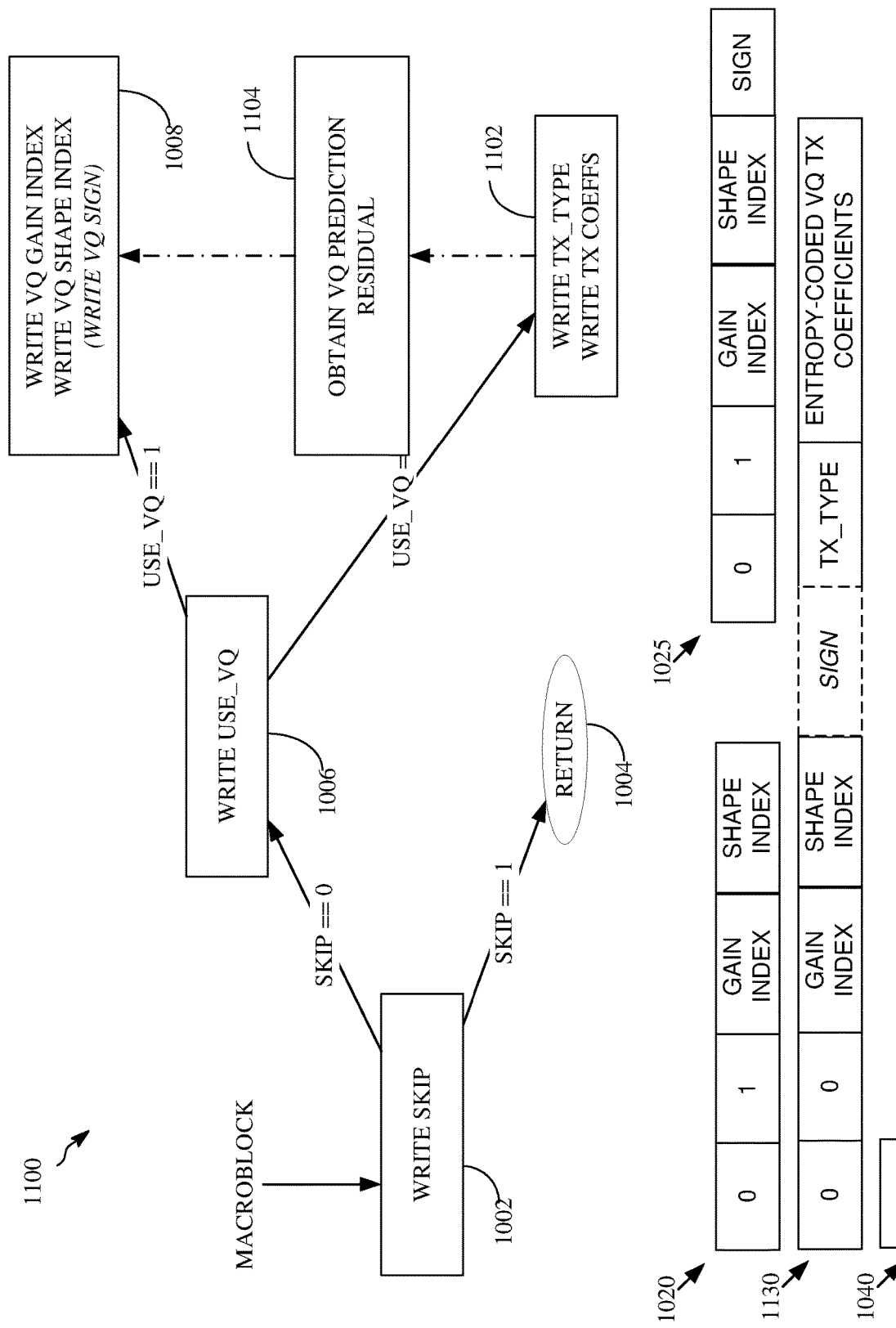
FIG. 11 is a diagram of a flowchart of a technique for bitstream syntax coding when using vector quantization in an encoder according to an implementation of this disclosure.

FIG. 11 is a diagram of a flowchart of a technique 1100 for bitstream syntax coding when using vector quantization in an encoder according to an implementation of this disclosure. The technique 1100 includes blocks similar to those of the technique 1000 of FIG. 10. Descriptions of those similar blocks (i e, similarly numbered blocks) are omitted with respect to FIG. 11.

The technique 1100 differs from the technique 1000 in that, instead of transforming the prediction residual to the frequency domain to obtain a transform block at 1008, the technique 1100 obtains (i.e., calculates, etc.) a differential prediction residual by subtracting a VQ prediction residual from the prediction block and then transforming the differential prediction residual to the frequency domain. The VQ prediction residual corresponds to the GSVQ quantization of the prediction residual.

As such, before writing the transform type and the transform coefficients at 1102, the technique 1100 determines, for the prediction residual, a gain scalar (i.e., a) from the shape code vector and a shape vector (i.e., y) from the gain codebook and the shape codebook, respectively; calculates the VQ prediction residual as a·y; obtains, at 1104, the VQ prediction residual; transforms the VQ prediction residual using the transform type to obtain the transformed VQ prediction residual; encodes (i.e., writes), at 1008, the gain index of the gain scalar, and the shape index of the shape code vector in the compressed bitstream; and encodes (i.e., writes), at 1102, the transform type and the transformed VQ prediction residual to the compressed bitstream. As described above, in some examples, the technique 1100 can additionally determine, for the prediction residual, a sign. As such, the technique 1100 calculates the VQ prediction residual as sign y.

Bitstream portions 1020, 1025, 1130, and 1040 illustrate the different organizations of portions of the compressed bitstream. The bitstream portion 1020, the bitstream portion 1025, and the bitstream portion 1040 are as described with respect to FIG. 10.

The bitstream portion 1130 illustrates the organization of the compressed bitstream when the technique 1000 performs the sequence 1002-1006-1102. As such, the bitstream portion 1130 includes a 0 flag for the SKIP syntax element, followed by a 0 for the USE_VQ syntax element, followed by bits (first bits) that encode the gain index, followed by bits (second bits) that encode the shape index, optionally followed (as illustrated by the dashed lines and depending on the implementation) by a sign bit, followed by bits that encode the transform type (third bits), and followed by bits (fourth bits) of entropy encoded coefficients of the transformed VQ prediction residual. It is noted that the sign bit (if included), the first, second, third, and fourth bits can be arranged in any order in the compressed bitstream.

A decoder, such as the decoder 500 of FIG. 5, can receive the compressed bitstream, such the compressed bitstream 420 of FIG. 5. The decoder includes or can have access to the same lookup tables (i.e., the shape codebook and gain codebook) as the encoder that produced the compressed bitstream.

The decoder decodes a first syntax element (SKIP). If SKIP is equal to 1, the decoder can decode the quantized prediction residual from the compressed bitstream using the transform skip mode to obtain the residual block.

If SKIP is equal to 0, the decoder decodes a second syntax element (USE_VQ).

In an implementation. if USE_VQ is equal to 1, then the decoder decodes a gain index and a shape index. The decoder uses the shape index to look up a shape vector (i.e., y) in a shape cookbook. The decoder uses the gain index to look up a gain scalar value (i.e., a) in the gain codebook. The decoder calculates the residual block as a·y.

In another implementation. if USE_VQ is equal to 1, then the decoder decodes a gain index, a shape index, and a sign. The decoder uses the shape index to look up a shape vector (i.e., y) in a shape cookbook. The decoder uses the gain index to look up a gain scalar value (i.e., a) in the gain codebook. The decoder calculates the residual block as sign·a·y.

If USE_VQ is equal to 0, the decoder can decode a gain index, a shape index, a transform type, and VQ transform coefficients from the compressed bitstream. The VQ transform coefficients corresponding to entropy encoded coefficients of the transformed VQ prediction residual.

Using the transform type and the VQ transform coefficients, the decoder can obtain (such as via stages including entropy decoding, dequantizing, and inverse transforming, or a subset thereof) the differential prediction residual. The decoder can use the gain index and the shape index to obtain (e.g., lookup, etc.), respectively, a gain value (i.e., a) from the gain codebook and a shape code vector (i.e., y) from the shape codebook. Using the gain value and the shape code vector, the decoder obtains the VQ prediction residual (i.e., a·y). The decoder can then reconstitute the prediction residual by adding the VQ prediction residual to the differential prediction residual.

The decoder can then use the residual block to reconstruct a current block, as described above with respect to FIG. 5.

Figure 12:
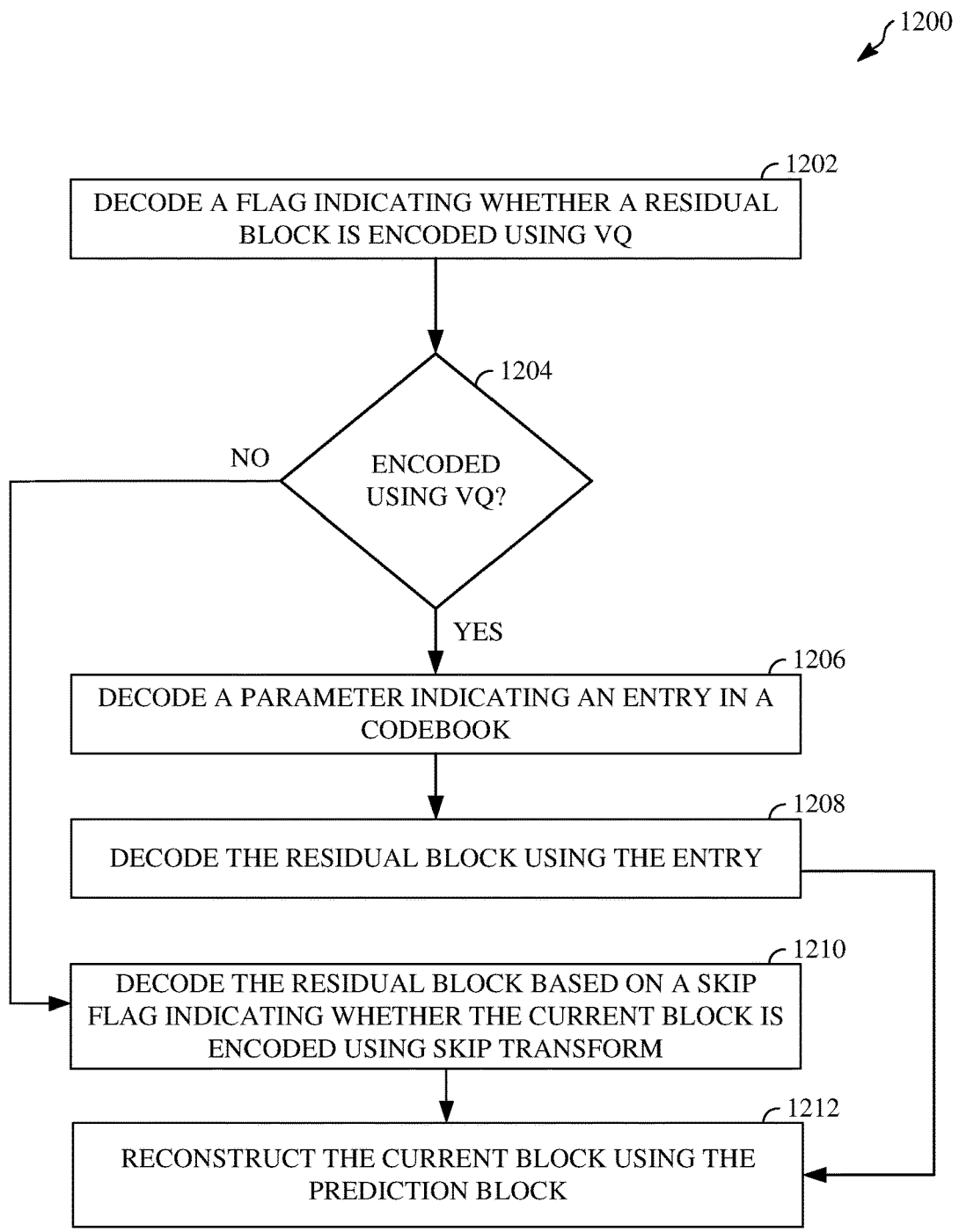
FIG. 12 is a diagram of a flowchart of a technique for decoding a current block according to an implementation of this disclosure.

FIG. 12 is a diagram of a flowchart of a technique 1200 for decoding a current block according to an implementation of this disclosure. The technique 1200 can be implemented in a decoder, such as the decoder 500 of FIG. 5. The technique 1200 decodes a residual block (i.e., a prediction residual) from a compressed bitstream, which can be the compressed bitstream 420 of FIG. 5, to reconstruct the current block, as described with respect to the reconstruction stage 510 of FIG. 5.

The technique 1200 can be implemented, for example, as a software program that may be executed by a computing device, such as the receiving station 106. For example, the software program can include machine-readable instructions that may be stored in a memory such as the memory 204 or the secondary storage 214, and that, when executed by a processor, such as the processor 202, may cause the computing device to perform the technique 1200. The technique 1200 can be implemented using specialized hardware or firmware. For example, a hardware component can be configured to perform the technique 1200. As explained above, some computing devices may have multiple memories or processors, and the operations described in the technique 1200 can be distributed using multiple processors, memories, or both.

The technique 1200 can also be implemented in an encoder, such as the encoder 400 of FIG. 4. The technique 1200 can be implemented in the reconstruction path of the encoder.

At 1202, the technique 1200 can decode, from the compressed bitstream, a flag indicating whether the residual block for the current block is encoded using vector quantization (VQ). The flag can be the USE_VQ syntax element described above.

At 1204, the technique 1200 determines whether the residual block is encoded using VQ. For example, if the residual block is not encoded using VQ (such us, for example, if USE_VQ syntax element is equal to 0), then the technique 1200 proceeds to 1208; if the residual block is encoded using VQ (such us, for example, if USE_VQ syntax element is equal to 1), then the technique 1200 proceeds to 1210.

At 1206, the technique 1200 decodes a parameter indicating an entry in a codebook. As mentioned above, decoding the parameter indicating the entry in the codebook can include decoding a gain index and decoding a shape index. In an implementation, the technique 1200 can also decode a sign. The gain index, the shape index, and the sign (if decoded) can be as described above. Using the gain index, the technique 1200 can select a gain value (a gain scalar a) from a gain codebook, as described above. That is, the gain index can be used to look up the gain value in the gain codebook. Using the shape index, the technique 1200 can select a shape vector (i.e., a shape code vector, y) from a shape codebook. As described above, the shape vector can be a unit-norm vector (i.e., a unit-norm prediction residual). The decoder uses the same (e.g., copies of) gain codebook and shape codebook used by the encoder that produced the compressed bitstream.

At 1208, the technique 1200 decodes the residual block using the entry. That is, in an example, the residual block can be obtained by multiplying the gain shape by the shape vector (i.e., a·y). In another example, where a sign is also decoded, the residual block can be by multiplying the sign, the gain shape, and the shape vector (i.e., sign·a·y).

At 1212, the technique 1200 reconstructs the current block using the prediction block. The current block can be reconstructed using the residual block as described above with respect to FIG. 5.

At 1210, the technique 1200 decodes the residual block based on a skip flag indicating whether the current block is encoded using transform skip (i.e., transform skip mode). In an example, and as described with respect to FIG. 9, decoding the residual block based on a skip flag indicating whether the current block is encoded using transform skip can include: in response to the skip flag indicating that the current block is not encoded using skip transform, decoding a transform type, decoding a transform block, and generating the residual block using the transform type and the transform block; and in response to the skip flag indicating that the current block is encoded using transform skip, decoding the residual block without performing an inverse transform operation.

Figure 13:
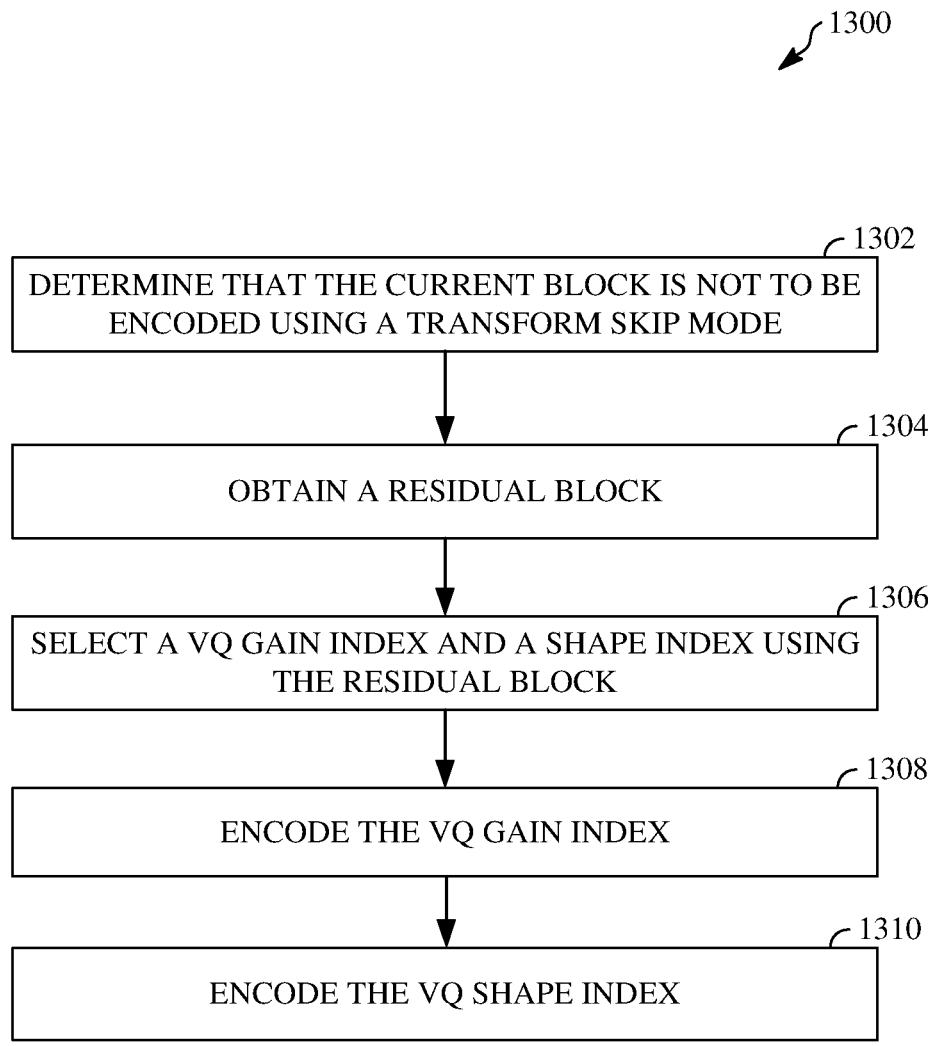
FIG. 13 is a diagram of a flowchart of a technique for encoding a current block using vector quantization according to an implementation of this disclosure.

FIG. 13 is a diagram of a flowchart of a technique 1300 for encoding a current block using vector quantization (VQ) according to an implementation of this disclosure. The technique 1300 may be implemented in an encoder, such as the encoder 400 of FIG. 4. The technique 1300 encodes the current block into a compression bitstream, such as the compressed bitstream 420 of FIG. 4. More specifically, the technique 1300 obtains a residual block for the current block and writes (i.e., encodes) information related to the residual block in the compressed bitstream, which a decoder can use to decode the residual block.

The technique 1300 can be implemented, for example, as a software program that may be executed by computing devices such as the transmitting station 102. For example, the software program can include machine-readable instructions that may be stored in a memory such as the memory 204 or the secondary storage 214, and that, when executed by a processor, such as the processor 202, may cause the computing device to perform the technique 1300. The technique 1300 can be implemented using specialized hardware or firmware. For example, a hardware component can be configured to perform the technique 1300. As explained above, some computing devices may have multiple memories or processors, and the operations described in the technique 1300 can be distributed using multiple processors, memories, or both.

At 1302, the technique 1300 determines whether the current block is not to be encoded using a transform skip mode. For example, the current block is determined not to be encoded using the transform skip mode as described with respect to SKIP=0 (i.e., when the technique 1000 write SKIP=0 to the compressed bitstream, at 1002 of FIG. 10). For example, the current block is determined not to be encoded using the transform skip mode as described with respect to SKIP=0 (i.e., when the technique 1100 write SKIP=0 to the compressed bitstream, at 1002 of FIG. 11).

In response to determining that the current block is not to be encoded using transform skip mode, the technique 1300 obtains (at 1304) a residual block (i.e., a prediction residual) for the current block. In an example, the prediction residual can be obtained using intra prediction. For example, the prediction residual can be obtained from/using the intra/inter prediction stage 402 of FIG. 4. At 1306, the technique 1300 selects a VQ gain index and a VQ shape index using the residual block. That is, and as described above, the technique 1300 can obtain a norm (e.g., a length) of the prediction residual and can obtain a unit-norm prediction residual (i.e., a normalized residual block) by dividing the prediction block (which can be thought of as a one-dimensional or a two-dimensional array). Using a gain codebook, the norm (e.g., the magnitude, the length, etc.) of the norm can be quantized to the closest entry or value in the gain codebook. The closest value in the gain codebook corresponds to a gain index (a VQ gain index, a first index) in the gain codebook. The norm-unit prediction residual can be quantized to the closest entry or code vector in the shape codebook. The closest code vector in the shape codebook corresponds to a shape index (a VQ shape index, a second index) in the shape codebook.

At 1308, the technique 1300 encodes the VQ gain index in the compressed bitstream. At 1310, the technique 1300 encodes the VQ shape index in the compressed bitstream.

In an example, and as mentioned above, the current block can be a 4×4 luma (i.e., luminance) block. However, the current block can be a luma block or a chroma block of any other size. In an example, the gain codebook can include 16 entries and the shape codebook can include 256 entries. In an example, the encoder can use different pairs of gain codebooks and shape codebooks for different current block sizes. In an example, the encoder can use different pairs of gain codebooks and shape codebooks for different color components. As mentioned above, a pair of shape codebook and the gain codebook can be obtained by off-line training using residual blocks as training samples.

In an example, and as described with respect to FIGS. 10 and 11, the technique 1300 can include encoding, in the compressed bitstream, a first flag indicating that the current block is not to be encoded using the transform skip mode (e.g., SKIP=0); and encoding, in the compressed bitstream, a second flag indicating whether the current block is to be encoded using VQ (e.g., USE_VQ=0 or USE_VQ=1).

In an example, and as described with respect to 1102 of FIG. 11, encoding the current block using the VQ gain index and the VQ shape index can include determining whether VQ is to be used for encoding the current block; and in response to determining that VQ is not to be used for encoding the current block, obtaining a VQ residual block using the VQ gain index and the VQ shape index, obtaining a differential prediction residual as a difference between the VQ residual block and the residual block, transforming the differential prediction residual to obtain a transformed differential prediction residual, and encode the transformed differential prediction residual.

In an example, encoding the current block using the VQ gain index and the VQ shape index can include determining whether VQ is to be used for encoding the current block; and in response to determining that VQ is to be used for encoding the current block, encode a first flag indicating that the current block is not to be encoded using the transform skip mode (i.e., SKIP=0), and encode a second flag indicating that the current block is to be encoded using VQ (i.e., USE_VQ=1).

In an example, at 1306, the technique 1300 can, in addition to selecting a VQ gain index and a VQ shape index using the residual block, select a sign, as described above with respect to FIG. 8. Accordingly, the technique 1300 can also include encoding the sign in the compressed bitstream.

Using VQ for prediction residual coding can result in performance improvements. For example, as compared to not using VQ, decoder times have been shown to be reduced to 96.35% for key frames and 97.78% overall.

For simplicity of explanation, the techniques 900, 1000, 1100, 1200, and 1300 are each depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or a general-purpose processor with a computer program that, when executed, carries out any of the respective methods, algorithms, and/or instructions described herein. In addition, or alternatively, for example, a special purpose computer/processor can be utilized that can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device, and/or a device including an encoder 400 may also include a decoder 500.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law to encompass all such modifications and equivalent arrangements.

What is claimed is:

1. An apparatus for decoding a current block of video, comprising:
   a memory; and
   a processor, the processor configured to execute instructions stored in the memory to:
      decode, from a compressed bitstream, a flag indicating whether a residual block for the current block is encoded using vector quantization (VQ);
      in response to the flag indicating that the residual block is encoded using VQ, execute instructions to:
         decode a parameter indicating an entry in a codebook wherein to decode the parameter indicating the entry in the codebook comprises to:
            decode a gain index identifying a gain scalar from a gain codebook, wherein the gain scalar represents a magnitude of the residual block;
            decode a shape index identifying a unit-norm vector from a shape codebook, wherein the unit-norm vector represents a directional pattern of the residual block; and
            decode a sign bit value; and
         decode the residual block using the entry, wherein to decode the residual block comprises to: decode the residual block by multiplying the sign bit value, the gain scalar, and the unit-norm vector;
      in response to the flag indicating that the residual block is not encoded using VQ, execute instructions to:
         decode the residual block based on a skip flag indicating whether the current block is encoded using transform skip; and
      reconstruct the current block using the residual block.

2. The apparatus of claim 1, wherein to decode the parameter indicating the entry in the codebook comprises to:
   select, using the gain index, a gain value from the gain codebook; and
   select, using the shape index, a shape vector from the shape codebook.

3. The apparatus of claim 1, wherein to decode the residual block based on the skip flag indicating whether the current block is encoded using transform skip comprises to:
in response to the skip flag indicating that the current block is not encoded using transform skip, execute instructions to:
decode a transform type;
decode a transform block; and
generate the residual block using the transform type and the transform block; and
in response to the skip flag indicating that the current block is encoded using transform skip, decode the residual block without performing an inverse transform operation.

4. An apparatus for encoding a current block using vector quantization (VQ), comprising:
a memory; and
a processor, the processor configured to execute instructions stored in the memory to:
determine whether the current block is not to be encoded using a transform skip mode; and
in response to determining that the current block is not to be encoded using transform skip mode, execute instructions to:
obtain a residual block for the current block;
select a VQ gain index from a gain codebook identifying a gain scalar, wherein the gain scalar represents a magnitude of the residual block;
select a VQ shape index from a shape codebook identifying a unit-norm vector, wherein the unit-norm vector represents a directional pattern of the residual block;
select a sign bit representing a value of +1 or −1 to be multiplied with the gain scalar and the unit-norm vector, wherein the residual block is quantized to a multiplication of the sign bit, the gain scalar, and the unit-norm vector;
encode, in a compressed bitstream, the VQ gain index;
encode, in the compressed bitstream, the VQ shape index; and
encode, in the compressed bitstream, the sign bit.

5. The apparatus of claim 4, wherein the gain codebook consists of 16 entries, and the shape codebook consists of 256 entries.

6. The apparatus of claim 4, wherein to select the VQ gain index and the VQ shape index using the residual block comprises to:
calculate a norm of the residual block;
identify an entry in the gain codebook having a minimum distance to the calculated norm, wherein the VQ gain index corresponds to the identified entry in the gain codebook;
obtain a normalized residual block by dividing the residual block by the norm; and
identify an entry in the shape codebook having a minimum distance to the normalized residual block, wherein the VQ shape index corresponds to the identified entry in the shape codebook.

7. The apparatus of claim 4, wherein the gain codebook and the shape codebook are obtained by off-line training using residual blocks as training samples.

8. The apparatus of claim 4, wherein the instructions further comprise instructions to:
encode, in the compressed bitstream, a first flag indicating that the current block is not to be encoded using the transform skip mode; and
encode, in the compressed bitstream, a second flag indicating whether the current block is to be encoded using VQ.

9. The apparatus of claim 4, wherein to encode the current block using the VQ gain index and the VQ shape index comprises to:
determine whether VQ is to be used for encoding the current block; and
in response to determining that VQ is not to be used for encoding the current block, perform instructions to:
obtain a VQ residual block using the VQ gain index and the VQ shape index;
obtain a differential prediction residual as a difference between the VQ residual block and the residual block;
transform the differential prediction residual to obtain a transformed differential prediction residual, wherein the transformed differential prediction residual is a frequency domain block; and
encode, in the compressed bitstream, the transformed differential prediction residual.

10. The apparatus of claim 4, wherein to encode the current block using the VQ gain index and the VQ shape index comprises to:
determine whether VQ is to be used for encoding the current block; and
in response to determining that VQ is to be used for encoding the current block, perform instructions to:
encode, in the compressed bitstream, a first flag indicating that the current block is not to be encoded using the transform skip mode; and
encode, in the compressed bitstream, a second flag indicating that the current block is to be encoded using VQ.

11. A method for encoding a current block using vector quantization (VQ), comprising:
determining that the current block is not to be encoded using a transform skip mode;
obtaining a residual block for the current block;
selecting a VQ gain index identifying a gain scalar, a VQ shape index identifying a unit-norm vector, and a sign bit representing a value of +1 or −1 using the residual block, wherein the residual block is quantized to a multiplication of the gain scalar, the unit-norm vector, and the value;
encoding, in a compressed bitstream, the VQ gain index; and
encoding, in the compressed bitstream, the VQ shape index.

12. The method of claim 11, the VQ gain index is a first index into a gain codebook, and the VQ shape index is a second index into a shape codebook.

13. The method of claim 12, wherein the gain codebook consists of 16 entries and wherein the shape codebook consists of 256 entries.

14. The method of claim 12, wherein selecting the VQ gain index and the VQ shape index using the residual block comprises:
calculating a norm of the residual block;
identifying an entry in the gain codebook having a minimum distance to the calculated norm, wherein the VQ gain index corresponds to the identified entry in the gain codebook;
obtaining a normalized residual block by dividing the residual block by the norm; and
identifying an entry in the shape codebook having a minimum distance to the normalized residual block, wherein the VQ shape index corresponds to the identified entry in the shape codebook.

15. The method of claim 12, wherein the gain codebook and the shape codebook are obtained by off-line training using residual blocks as training samples.

16. The method of claim 11, further comprising:
encoding, in the compressed bitstream, a first flag indicating that the current block is not to be encoded using the transform skip mode; and
encoding, in the compressed bitstream, a second flag indicating whether the current block is to be encoded using VQ.

17. The method of claim 11, wherein encoding the current block using the VQ gain index and the VQ shape index comprises:
determining that VQ is not to be used for encoding the current block;
obtaining a VQ residual block using the VQ gain index and the VQ shape index;
obtaining a differential prediction residual as a difference between the VQ residual block and the residual block;
transforming the differential prediction residual to obtain a transformed differential prediction residual, wherein the transformed differential prediction residual is a frequency domain block; and
encoding, in the compressed bitstream, the transformed differential prediction residual.

18. The method of claim 11, wherein encoding the current block using the VQ gain index and the VQ shape index comprises:
determining that VQ is to be used for encoding the current block;
encoding, in the compressed bitstream, a first flag indicating that the current block is not to be encoded using the transform skip mode; and
encoding, in the compressed bitstream, a second flag indicating that the current block is to be encoded using VQ.

* * * * *